(12) United States Patent
Blomberg et al.

(10) Patent No.: US 11,194,862 B2
(45) Date of Patent: Dec. 7, 2021

(54) TOPIC BRIDGING DETERMINATION USING TOPICAL GRAPHS

(71) Applicant: International Business Machines Corporation, Armonk, NY (US)

(72) Inventors: Jeanette L. Blomberg, Portola Valley, CA (US); Eric K. Butler, San Jose, CA (US); Anca A. Chandra, Los Gatos, CA (US); Pawan R. Chowdhary, San Jose, CA (US); Susanne M. Glissmann-Hochstein, Berlin (DE); Thomas D. Griffin, Campbell, CA (US); Sunhwan Lee, San Mateo, CA (US); Robert J. Moore, San Jose, CA (US); Hovey R. Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/555,757

(22) Filed: Aug. 29, 2019

(65) Prior Publication Data
US 2019/0384791 A1 Dec. 19, 2019

Related U.S. Application Data

(63) Continuation of application No. 15/346,452, filed on Nov. 8, 2016, now Pat. No. 10,489,456.

(51) Int. Cl.
*G06F 16/901* (2019.01)
*G06F 16/33* (2019.01)
*G06F 16/31* (2019.01)

(52) U.S. Cl.
CPC ........ *G06F 16/9024* (2019.01); *G06F 16/316* (2019.01); *G06F 16/334* (2019.01)

(58) Field of Classification Search
CPC ... G06F 16/9024; G06F 16/334; G06F 16/316
See application file for complete search history.

(56) References Cited

U.S. PATENT DOCUMENTS

| | | |
|---|---|---|
| 8,805,845 B1 | 8/2014 | Li et al. |
| 2001/0044795 A1 | 11/2001 | Cohen et al. |
| 2003/0037034 A1 | 2/2003 | Daniels et al. |

(Continued)

OTHER PUBLICATIONS

Strong et al., "Generative conversation tool for game writers," Proceedings of the 4th International Conference on Foundations of Digital Games, 2009. (Year: 2009).*

(Continued)

*Primary Examiner* — Jay A Morrison
(74) *Attorney, Agent, or Firm* — Sherman IP LLP; Kenneth L. Sherman; Steven Laut

(57) ABSTRACT

One embodiment provides a method that includes generating, by a processor, a topic graph by converting information to topic nodes and edges in the topic graph. Bridges from a given topic node are provided to a neighbor node based on a weight assignment. The bridges are converted to an electronic form of communication. The processor orders suggested paths based on a determined distance from at least one other topic node to a topic goal node via an earliest topic node on each suggested path. The determined distance is found by a first search of the topic graph.

20 Claims, 18 Drawing Sheets

(56) References Cited

U.S. PATENT DOCUMENTS

| | | | |
|---|---|---|---|
| 2005/0055357 A1 | 3/2005 | Campbell | |
| 2008/0189367 A1* | 8/2008 | Okumura | H04L 51/02 709/204 |
| 2009/0083261 A1 | 3/2009 | Nagano et al. | |
| 2012/0124034 A1 | 5/2012 | Jing et al. | |
| 2014/0297268 A1 | 10/2014 | Govrin et al. | |
| 2014/0379729 A1 | 12/2014 | Savage et al. | |
| 2015/0149484 A1 | 5/2015 | Kelley | |
| 2015/0220995 A1* | 8/2015 | Guyot | G06Q 50/01 705/14.66 |
| 2016/0275201 A1* | 9/2016 | Li | G06F 16/221 |
| 2017/0060958 A1 | 3/2017 | Van Rest et al. | |

OTHER PUBLICATIONS

Anonymous, "Method to dynamically visualize the descendent links from a selected topic upto a specified linked node level and display it diagrammaticaliy", Jul. 25, 2011, pp. 1-4, IP.com, United States.

Tang, X. et al., "Keyword clustering for user interest profiling refinement within paper recommender systems", Journal of Systems and Software, Jul. 23, 2011, pp. 1-17, ResearchGate, United States.

IBM, "A System and Method for Topic Segmentation and Topic Lineage in Text Documents", Jun. 23, 2009, pp. 1-8, IP.com, United States.

Mell, P., et al., "The NIST Definition of Cloud Computing", National Institute of Standards and Technology Special Publication 800-145, Sep. 2011, pp. 1-7, U.S. Department of Commerce, United States.

Cataldi, M. et al., "Emerging topic detection on Twitter based on temporal and social terms evaluation," Proceedings of the tenth international workshop on multimedia data mining, Jul. 2010, pp. 1-10, ACM, United States.

Brandes, U., "On variants of shortest-path betweenness centrality and their generic computation," Social Networks 30.2, 2008, pp. 1-22.

List of IBM patents or patent applications treated as related: Blomberg, J. et al., U.S. Appl. No. 15/346,452, filed Nov. 8, 2016.

* cited by examiner

TOPIC BRIDGING DETERMINATION USING TOPICAL GRAPHS

BACKGROUND

Text mining may be used to extract information from documents and small pieces of documents called snippets. A snippet can be defined grammatically (e.g., sentence or paragraph) or it can be defined by a number of words. In conversations between an individual and a computer, the computer typically reacts to the individual using speech recognition. This reaction from the computer involves the information provided by the individual, such as problem solving or making a reservation that is driven from the individual's speech.

SUMMARY

Embodiments relate to topic bridging determination using topical graphs. One embodiment provides a method that includes generating, by a processor, a topic graph by converting information to topic nodes and edges in the topic graph. Bridges from a given topic node are provided to a neighbor node based on a weight assignment. The bridges are converted to an electronic form of communication. The processor orders suggested paths based on a determined distance from at least one other topic node to a topic goal node via an earliest topic node on each suggested path. The determined distance is found by a first search of the topic graph.

These and other features, aspects and advantages of the embodiments will become understood with reference to the following description, appended claims and accompanying figures.

DETAILED DESCRIPTION

Figure 1:
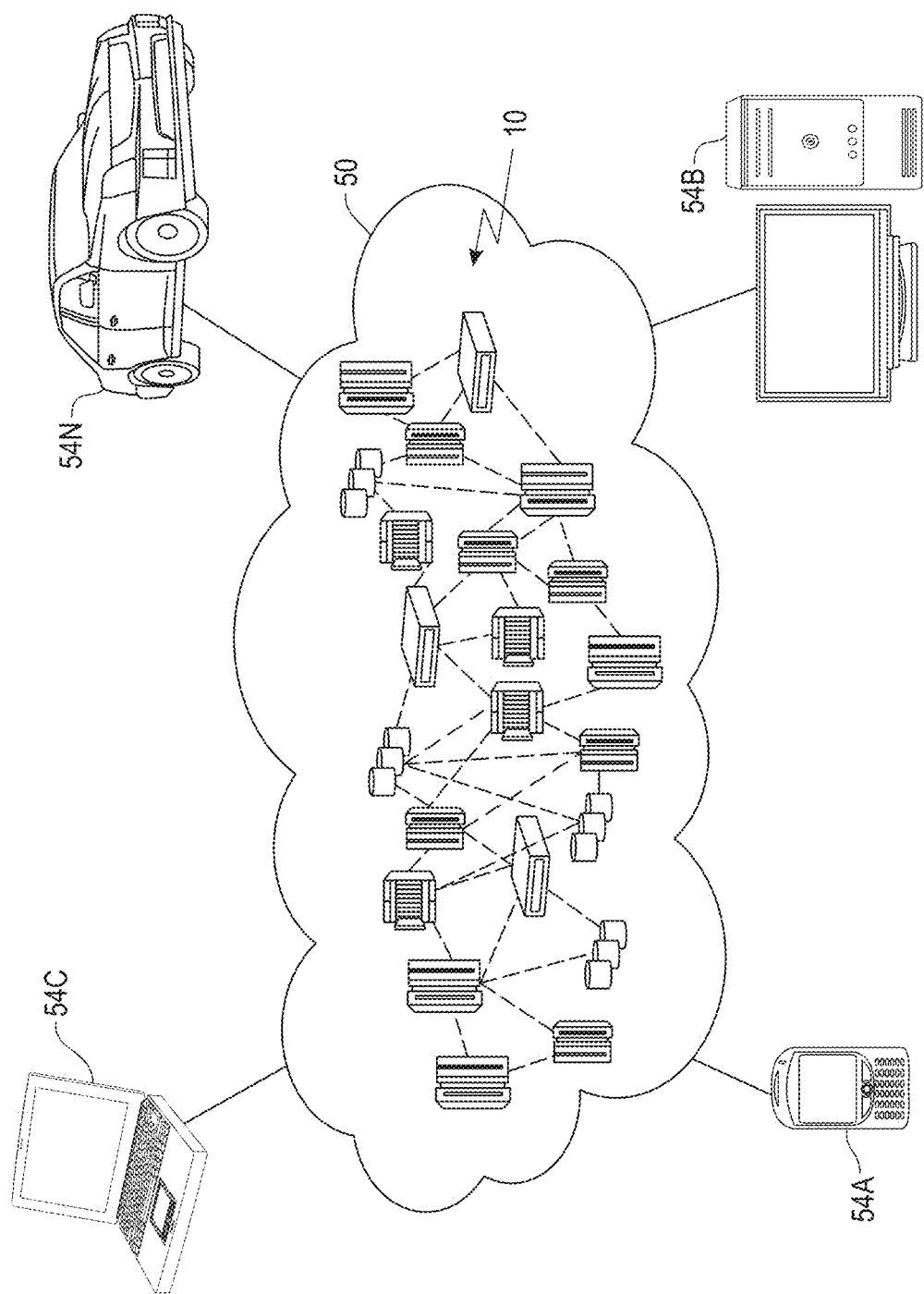
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, the embodiments are capable of being implemented in conjunction with any other type of computing environment now known or later developed.

One or more embodiments provide for topic bridging determination using topical graphs for guiding computer automated conversations with a potential client or for selection of conversational bridges (i.e., segues) for representative conversations with a potential client. One embodiment includes obtaining information data including profile information and current event information. A processor generates a topic graph by converting the information data to topic nodes in the topic graph. The processor determines a weight assignment for each topic node based on ratios of sums of weights of edges from topic nodes. Bridges are provided from a given topic node to a neighbor based on the weight assignment.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
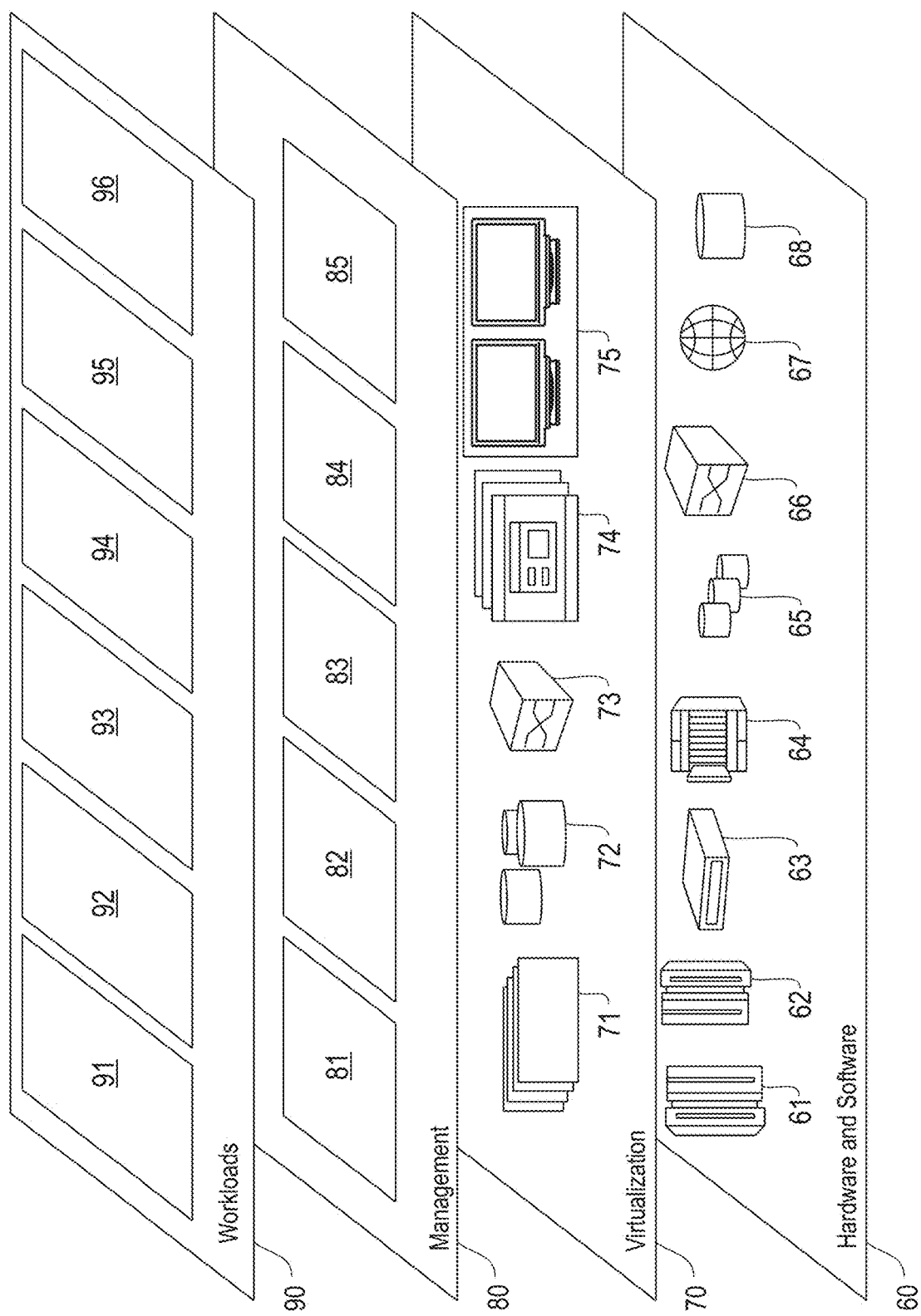
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conversational bridging processing 96. As mentioned above, all of the foregoing examples described with respect to FIG. 2 are illustrative only, and the embodiments are not limited to these examples.

It is understood all functions of one or more embodiments as described herein may be typically performed by the processing system 300 (FIG. 3) or the processor 500 (FIG. 5), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
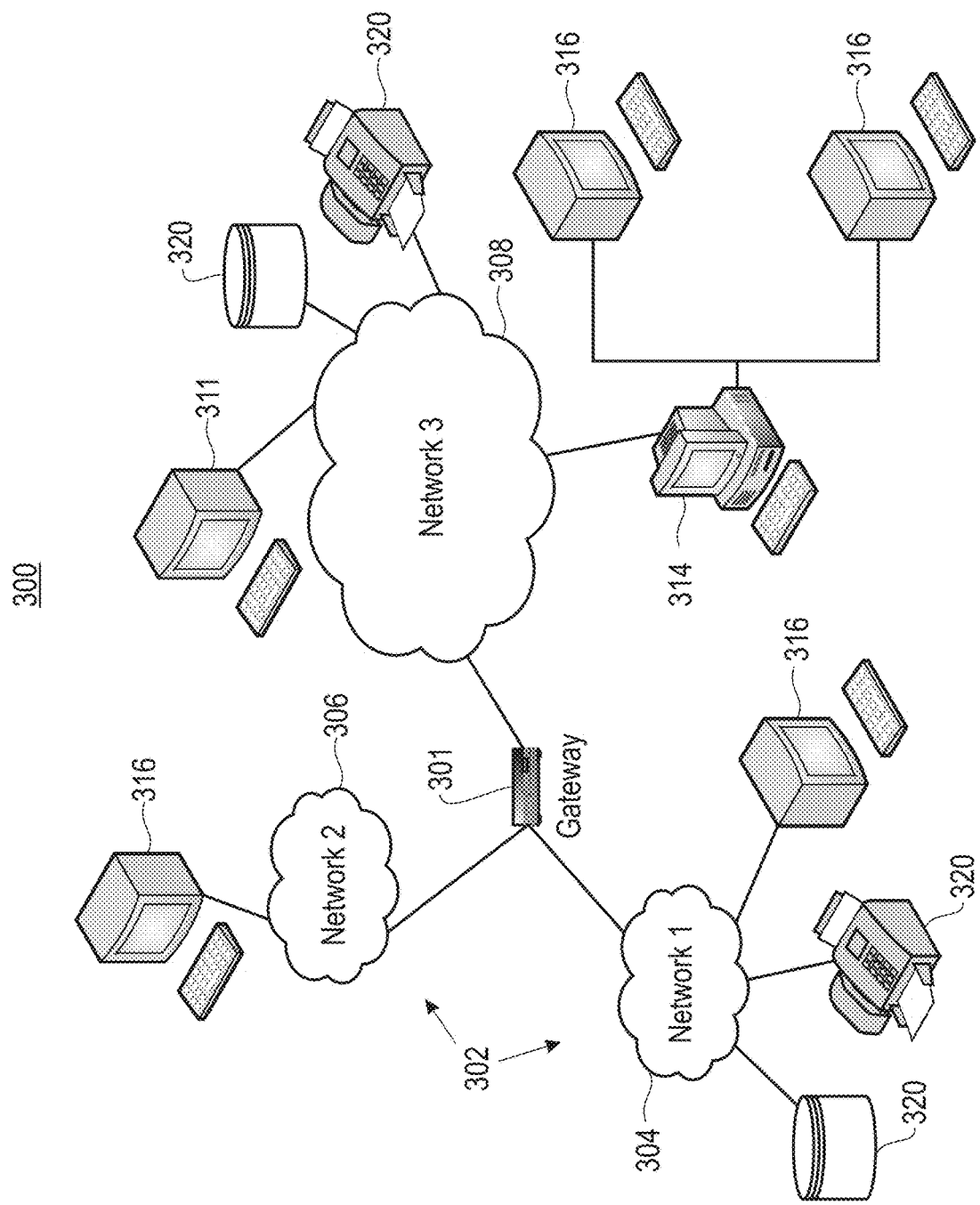
FIG. 3 is a network architecture for retrospective snapshots in log-structured storage systems, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
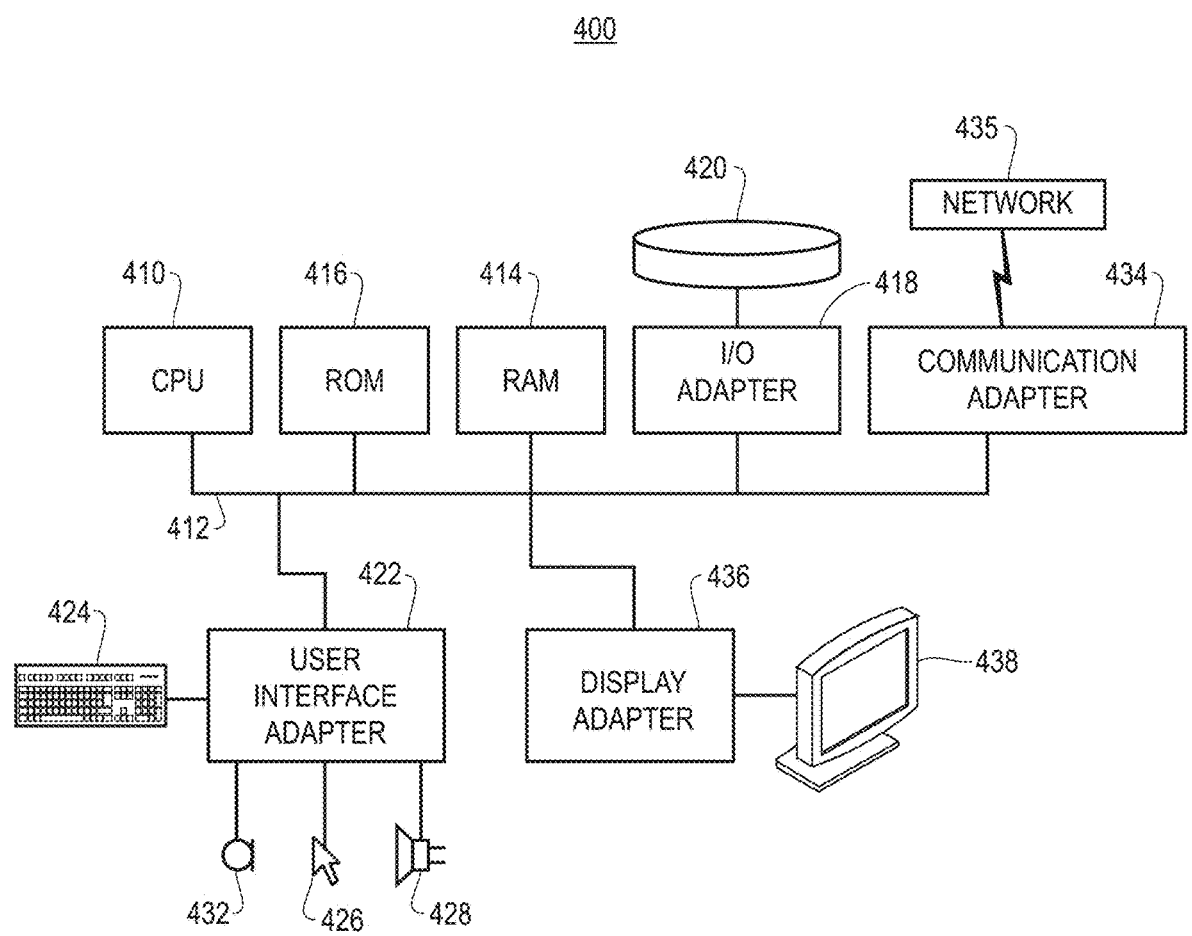
FIG. 4 shows a representative hardware environment that may be associated with the servers and/or clients of FIG. 1, according to an embodiment.

FIG. 4 shows a representative hardware system 400 environment associated with a user device 416 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
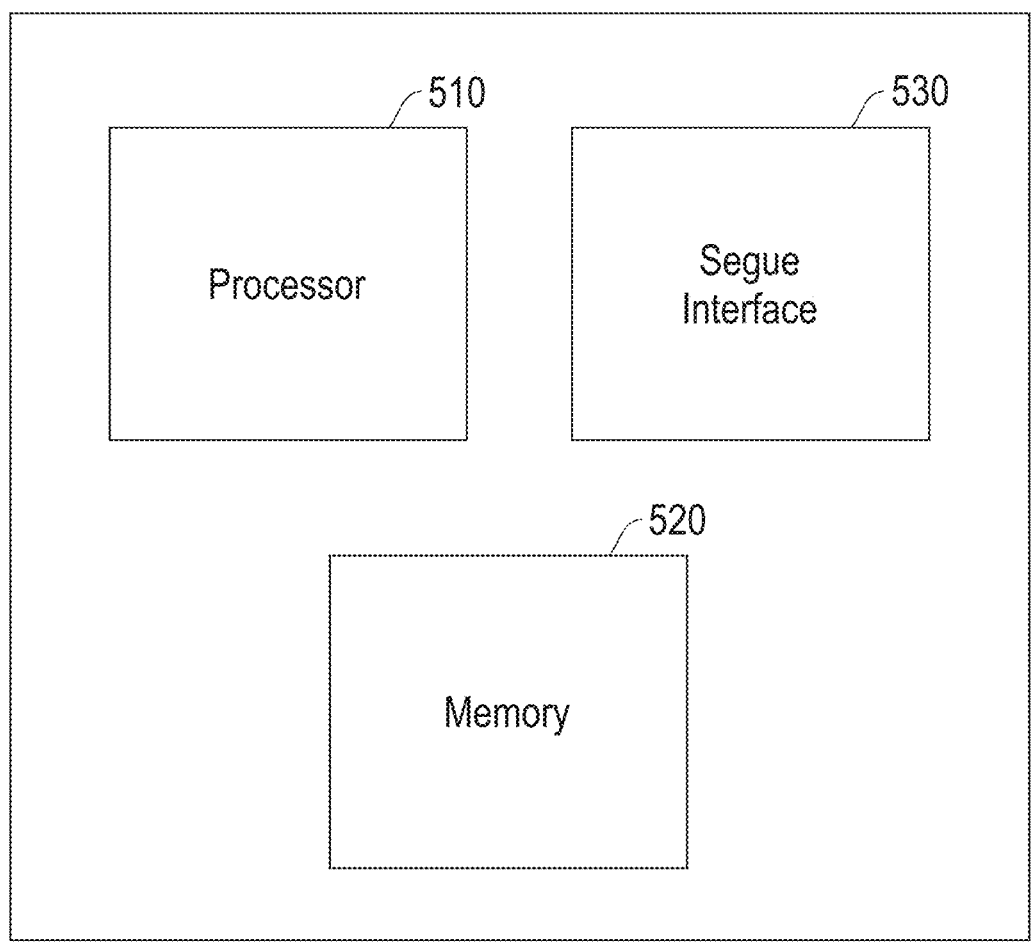
FIG. 5 is a block diagram illustrating a processor implemented for topic bridging determination using topic graphs, according to an embodiment.

FIG. 5 is a block diagram illustrating a processing node 500 for topic bridging determination using topic graphs, according to an embodiment. The processing node 500 includes one or more processors 510, a segue interface 530 and a memory 520. In one embodiment, each processor(s) 510 performs processing for generation of topic graphs including information, such as personal information of a potential client, individual or entity, proper nouns, current events, individual current events (e.g., health events, etc.), product categories, etc. The segue interface 530 provides traversal of the generated topic graphs where the edges represent appearance in a same snippet, which can be defined grammatically (e.g., sentence or paragraph) or as a particular number of words. In one example, a "tweet" can be treated as a snippet. The segue interface 530 determines conversational bridges between two topics where one participant in the conversation is guiding the conversation and the other (e.g., a programmed computer or process acting as a virtual representative using synthesized speech or text) is responding and choosing new topics independently. In one example, the segue interface 530 may be used in a sales conversation between a seller (e.g., a programmed computer or process acting as a sales representative using synthesized speech or text or a user of an application that guides conversational bridges between topics and provides recommendations (e.g., using text on a display, synthesized speech through a listening device (e.g., an ear bud, earphones, etc.))) and a potential client.

In one embodiment, the segue interface 530 obtains or receives information about a potential client or customer and information about a product or service that a salesperson or computerized representative is attempting to sell. In one example, the information may be obtained by customer/client profiles, information scraped from networks (e.g., the Internet or local area networks (LANs)), information manually entered into a database or application, provided by a third party, etc. In one embodiment, the segue interface 530 determines and provides recommendations to the sales person or computerized representative process in the form of conversational bridges that are likely to result in increasing customer interest to the extent that the customer experiences the product or service in question as the idea of the customer, or at least a joint product of the conversation.

In one embodiment, the segue interface 530 defines and provides heuristic solutions to the problem of selecting segues (conversational bridges) that increase the probability that the conversation moves toward a specified topic goal (or goals), making use of information such as current news, current events, hot topics and other mutually accessible topics of conversation. Some example use cases that may use suggested or selected conversational topics leading to a goal topic may be sales conversations with a potential customer, interviews (e.g., attempting to obtain an answer for a specific goal topic), etc.

In one embodiment, the memory 520 stores instructions and the processor 510 executes the instructions by communicating with the segue interface 530 to: obtain information including profile information and current event information, generate a topic graph by converting the information to topic nodes in the topic graph, determine distance for each of the topic nodes in the topic graph to a topic goal node based on a fraction of neighbors of each topic node that are closer by edge count or weighted edge count to the topic goal node than the topic node, along a path to the topic goal node, and provide suggested paths from neighbor topic nodes to the topic goal node based on determined distance between each of the topic nodes to the topic goal node.

Figure 6:
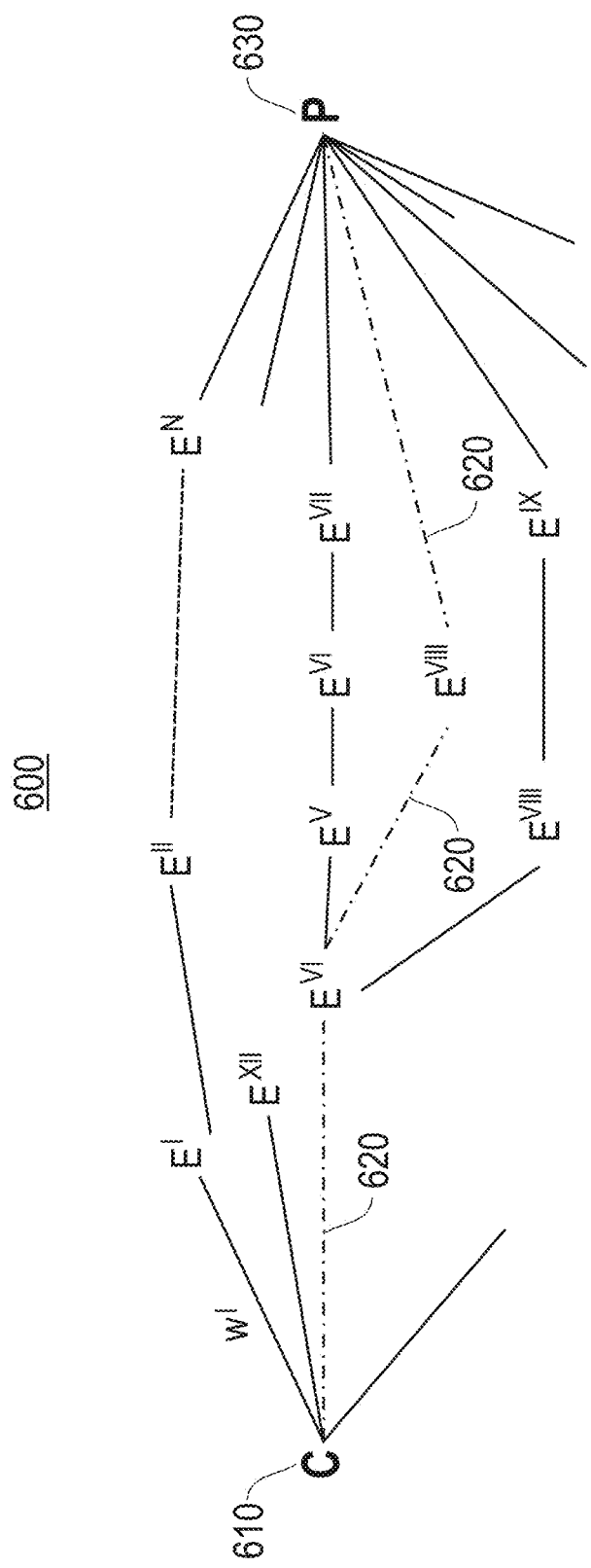
FIG. 6 illustrates an example generated topic graph showing edges between topic nodes, according to an embodiment.

FIG. 6 illustrates an example generated topic graph 600 showing edges between topic nodes, according to an embodiment. The topic graph includes information, such as personal information of a potential client, individual or entity, proper nouns, current events, individual current events (e.g., health events, etc.), product categories, etc. In one example, the profile of a customer (e.g., topic node C 610) provides edges ($E^1$ to $E^N$) to various topic nodes (e.g., topic w'). Current events provide both topics and edges. The processing node 500 determines a path for a conversationally appropriate way to navigate from C to the desired topic node goal P 630. In the example topical graph 600, the desired example path is path 620, which has the minimal number of edges (e.g., $E^{VI}$ and $E^{VIII}$).

In one embodiment, a topic graph is maintained based on personal (or client entity) profiles, product and service profiles, and current events (e.g., news, historical events, emergency events, weather related events, sporting events, personal health events, etc.). The topics may also include known synonyms. In one embodiment, the profiles may be obtained from individuals, entities, etc., received from third parties, etc. Given a potential customer, a salesperson (e.g., a virtual representative or real person), and a product (or service), the topic graph is restricted to topics connected to the customer, the salesperson, or the product/service by means of snippets from descriptions of current events. From the goal (product) node in the target topic graph, the processing node 500 (FIG. 5) performs a variant of breadth-first search labeling each node visited with a derived conversational distance to the goal. (Note that this distance is not a symmetric distance measure on the topic graph). The processing node provides a recommendation to the salesperson (or virtual representative process) the path involving shortest distance to the goal topic from the potential customer node, with advantage going to the path with first node shared by both potential customer and salesperson in case of ties. In one example, the goal of the salesperson is to try to keep the conversation on the recommended path. The path is chosen so that the customer is also likely to choose a conversational topic that stays on the path or can be easily returned to the path.

Figure 7:
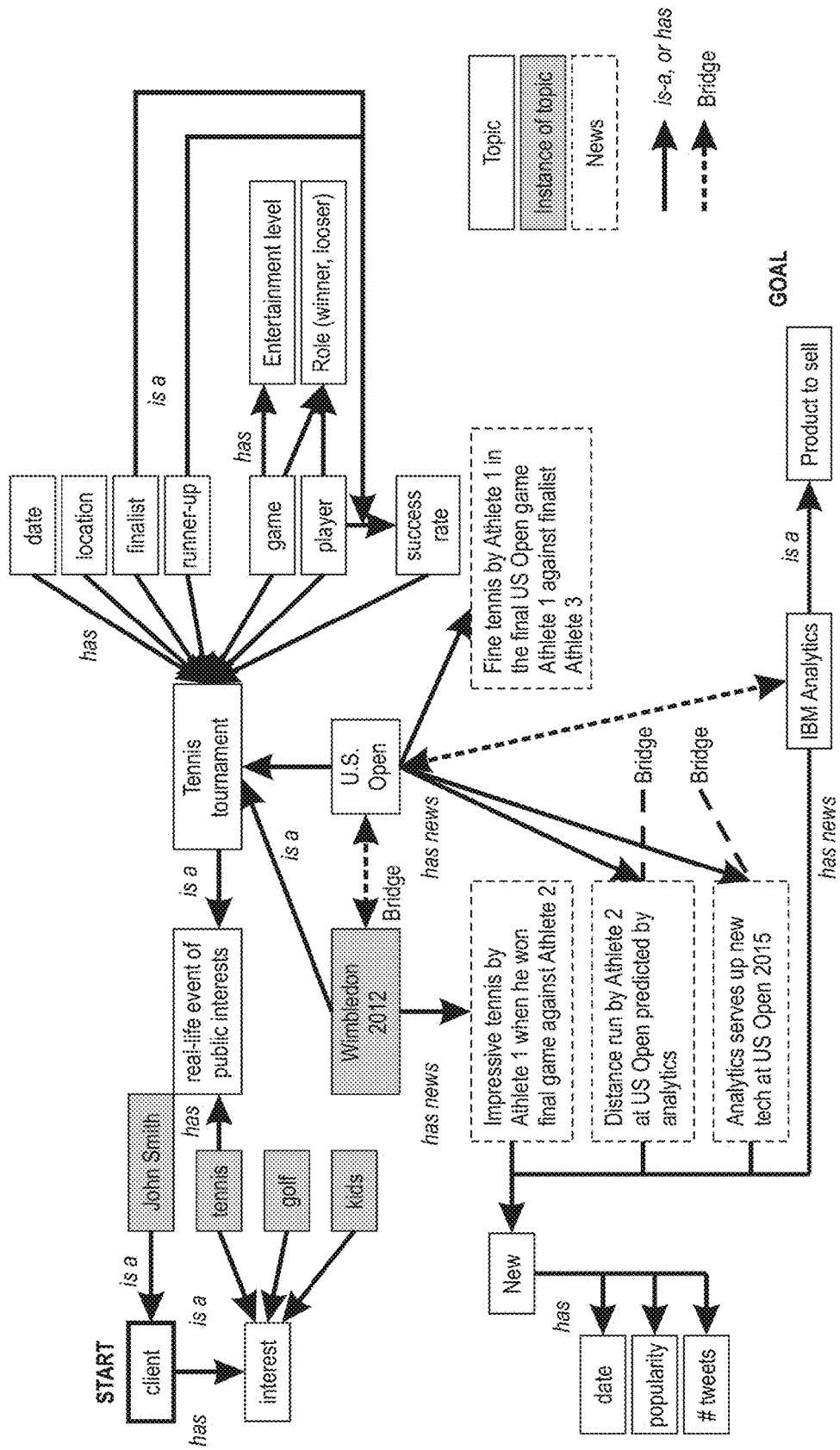
FIG. 7 is a block diagram illustrating an example flow for bridging topics to a goal topic using a generated topic graph, according to an embodiment.

FIG. 7 is a block diagram illustrating an example flow 700 for bridging topics to a goal topic using a generated topic graph, according to an embodiment. As shown, the example flow 700 includes topics, instances of the topic and news. In one embodiment, the connectors between the topics, instances of topics and news are classified as "is a" or "has," and bridges to get to the goal topic (e.g., a product). In this example flow 700, John Smith "is a" client and "has" an interest in tennis, golf and kids. In the example flow 700, tennis "has a" a real-life event of public interests is related to the instance of topic: tennis. News topics are provided, for example, from an analytic service or server (e.g., IBM analytics). The instance of topic Wimbledon 2012 has related news and is a bridge to the instance of topic U.S. Open, which in turn is a bridge to an instance of topic IBM Analytics, which is a product to sell that is the goal for segueing the conversation.

Returning to FIG. 5, the processing node 500 uses the processor 510, memory 520 and segue interface 530 to perform the following processing. In the generated topic graph represented in the memory 520, the segue interface begins a breadth-first search from the topic goal node.

Figure 8:
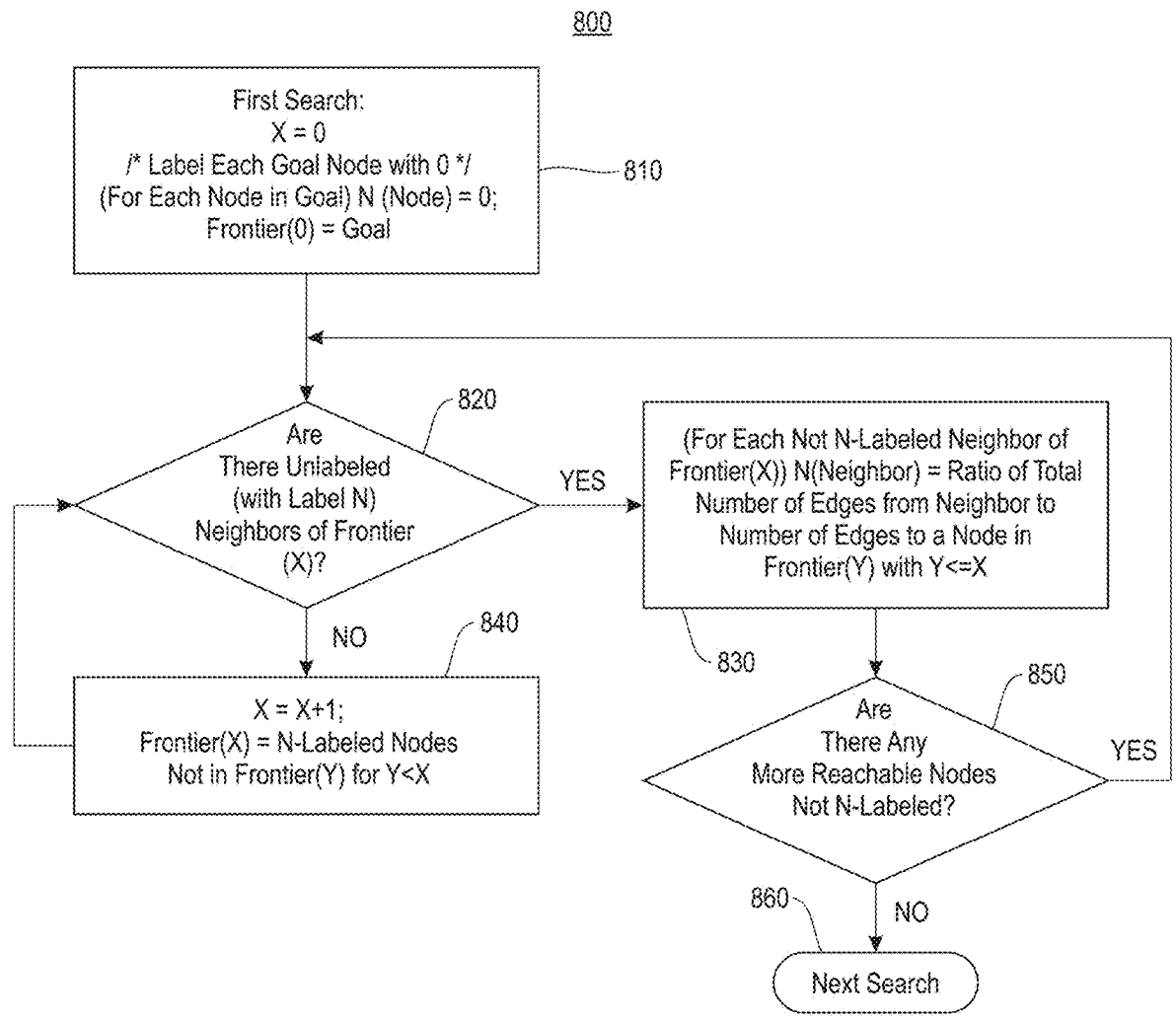
FIG. 8 is a block diagram illustrating an example flow for a first breadth-first search, according to an embodiment.

FIG. 8 is a block diagram illustrating an example flow 800 for a first breadth-first search, according to an embodiment in which labels called N-labels are provided for nodes. In block 810 each goal node is labeled 0 (e.g., N (node)=0) and a frontier (0)=goal starting out where X=0 (where X is the iteration). In block 820 it is determined whether there are unlabeled (with N-label) neighbors of frontier (X). If it is determined that there are neighbors of frontier (X), then the flow 800 proceeds to block 830, otherwise the flow 800 proceeds to block 840. In block 840, X is set to X+1 and frontier (X) is set equal to neighbors without N-labels of the previous frontier nodes.

In block 830, for each node of frontier (X), the N-label is set equal to the ratio of the total number of edges from the node to the number of edges to a node in frontier (Y) with Y<X. In block 850 it is determined whether there are any more reachable nodes that are not N-labeled. If it is determined that there are more reachable nodes that are not N-labeled, flow 800 proceeds to block 820, otherwise the flow is completed (i.e., end of the first breadth-first-search) at block 860 and the next search may begin (flow 900, FIG. 9).

Figure 9:
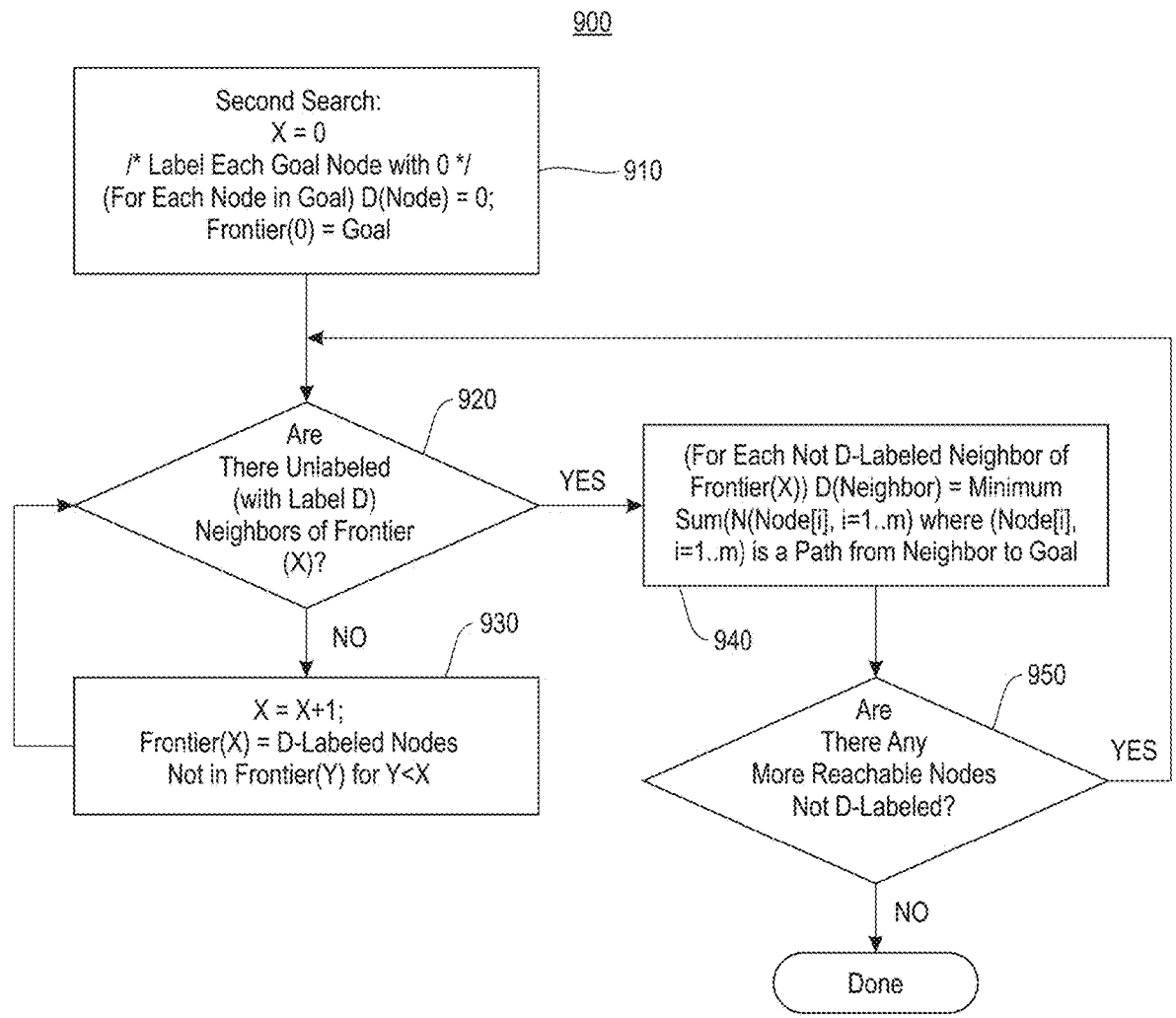
FIG. 9 is a block diagram illustrating an example flow for a second breadth-first search, according to an embodiment.

FIG. 9 is a block diagram illustrating an example flow 900 for a second breadth-first search, according to an embodiment. In block 910 each goal node is D-labeled 0 (e.g., D (node)=0) and a frontier (0)=goal starting out where X=0 (where X is the iteration) and D is a measure of distance to the goal set of nodes. In block 920 it is determined whether there are unlabeled (with label D) neighbors of frontier (X). If it is determined that there are neighbors of frontier (X), then the flow 900 proceeds to block 940, otherwise the flow 900 proceeds to block 930. In block 930, X is set to X+1 and frontier (X) is set equal to the neighbors of the previous frontier without D-labels (Y and X are integers).

In block 940, for each node without a D-label of frontier (X), D (node) is set equal to the minimum sum (N (node[i], i=1 . . . m)) where node[i], i=1 . . . m is a path from neighbor to goal. In block 950 it is determined whether there are any more reachable nodes that are not D-labeled. If it is determined that there are more reachable nodes that are not D-labeled, flow 900 proceeds to block 920, otherwise the flow 900 is completed (i.e., end of the second breadth-first-search).

Figure 10:
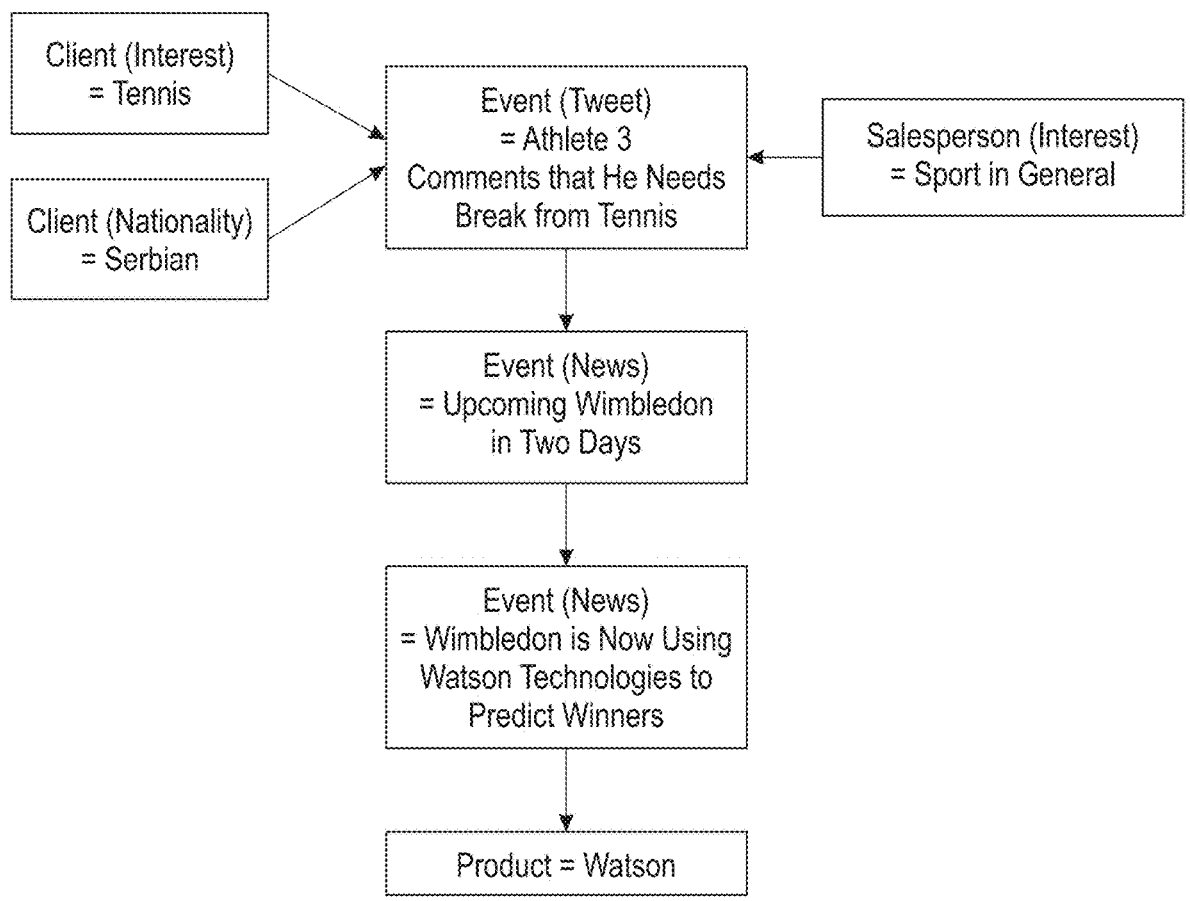
FIG. 10 is a block diagram illustrating another example flow for bridging topics to a goal topic using a generated topic graph, according to an embodiment.
Figure 11:
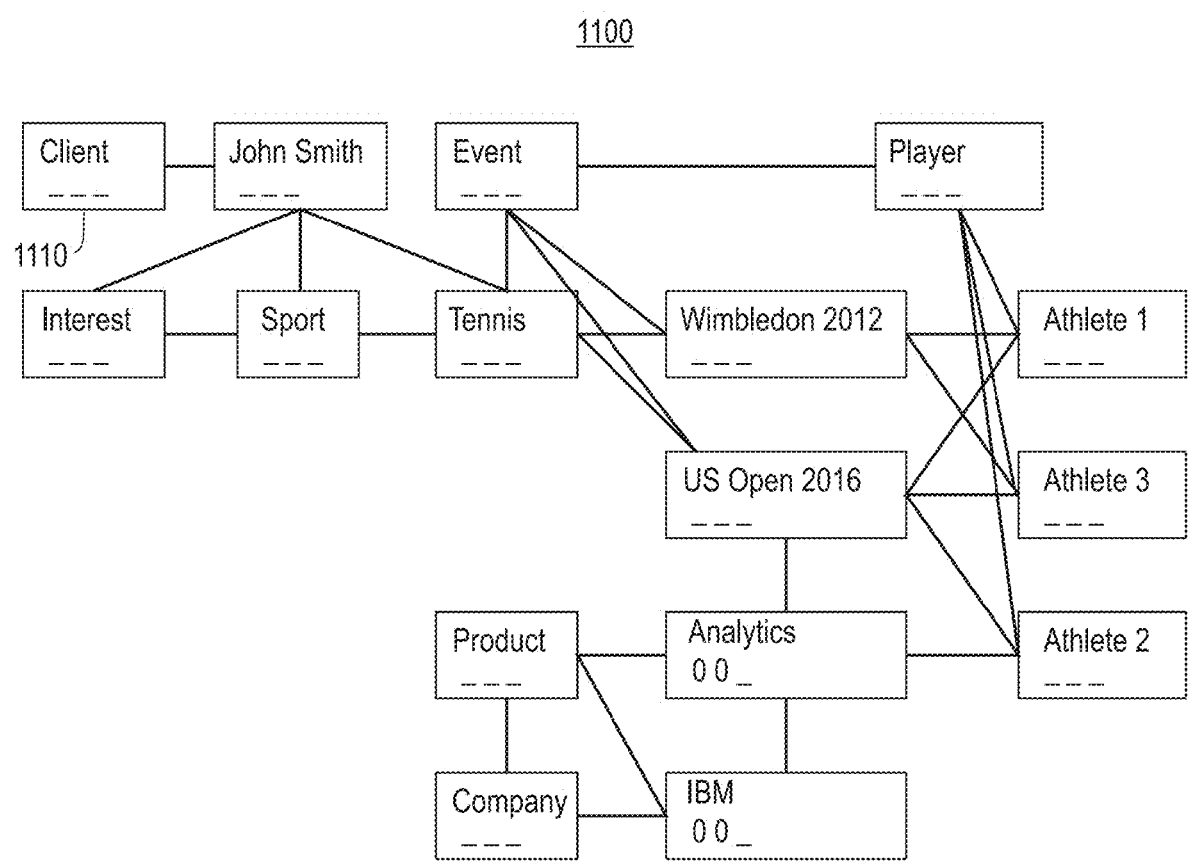
FIGS. 11-15 are examples of adding weights on nodes for bridging topics to a goal topic, according to an embodiment.

FIG. 10 is a block diagram illustrating an example flow for bridging topics to a goal topic using a generated topical graph, according to an embodiment. In this example, a client has an interest in tennis and the client's nationality is also determined (e.g., obtained from a profile, searching various social media platforms, entered into a database, requested directly, etc.). In this example, a tweet is an event and includes information that Novak Djokovic commented that he needs a break from tennis. In the example, the salesperson (e.g., a virtual representative or real person) starts dialog regarding sports in general as a topic node. The goal node topic in this case is a product/service "Watson." The processing node 500 (FIG. 5) begins with the topic nodes from the customer, the salesperson, and the event, and obtains further events that are related to the topic nodes (e.g., by searching networks, databases, etc., for other related current events to the topic nodes). The topic graph is generated and the suggestions are provided. The next event (news) is suggested as an upcoming Wimbledon tennis tournament in two days. Following the last topic node, event (news) segues or bridges the last topic node with "Wimbledon is now using Watson technologies to predict winners." The goal then is reached by providing the path to the goal topic of Watson. As noted above, the suggestions or recommendations may be provided to a display (e.g., a display of a smart device, computing device, etc.) and the salesperson may be able to use the suggestions during a dialog with the potential customer. The suggestions/recommendations may be inserted into a dialog stream between a virtual representative (e.g., a virtual representative during a call, inserted into a webpage (e.g., a popup chat session), etc.).

Figure 12:
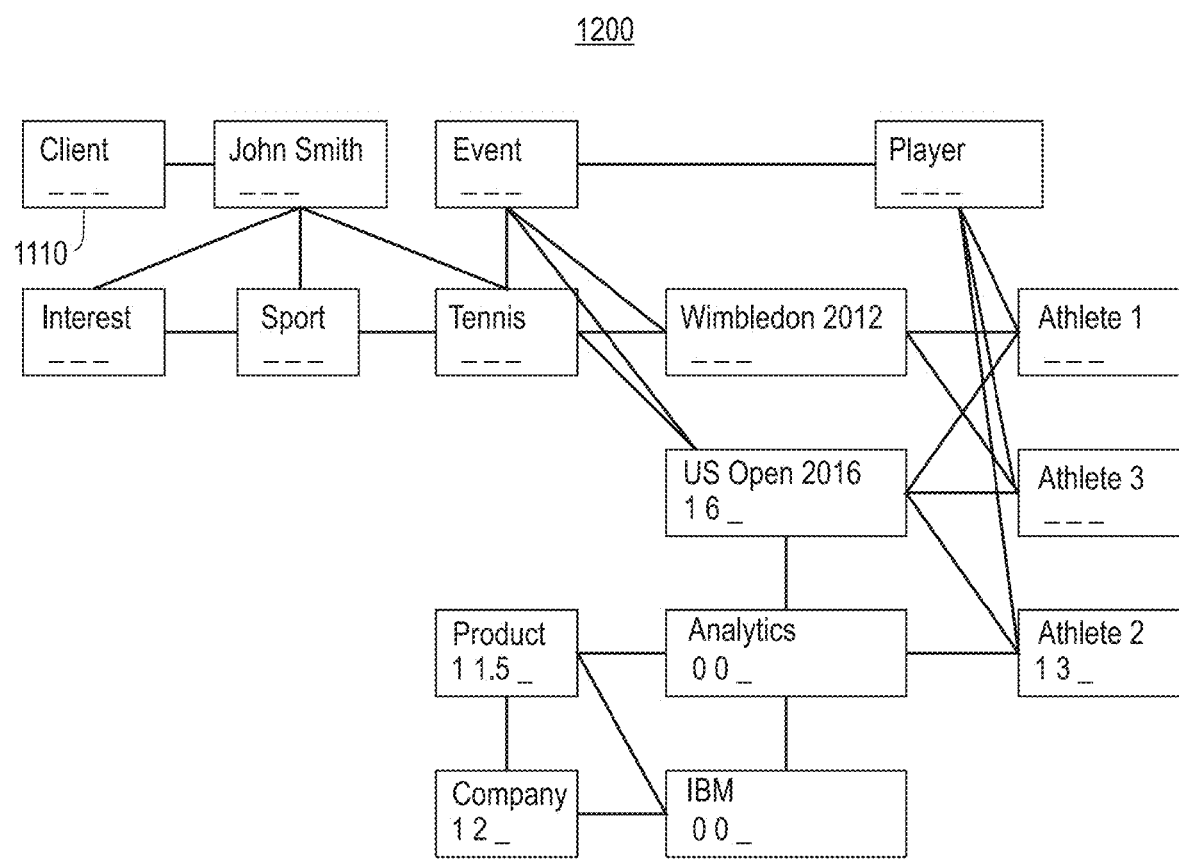
Figure 13:
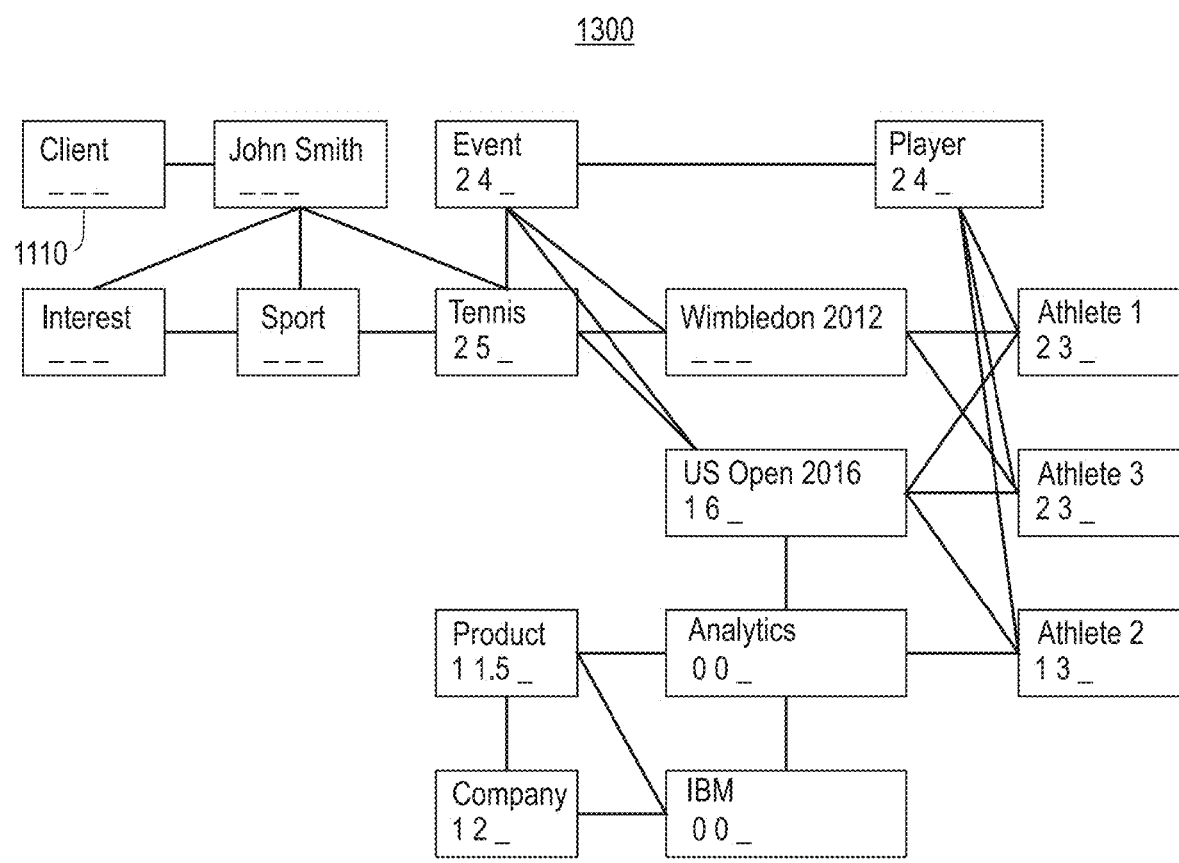
Figure 14:
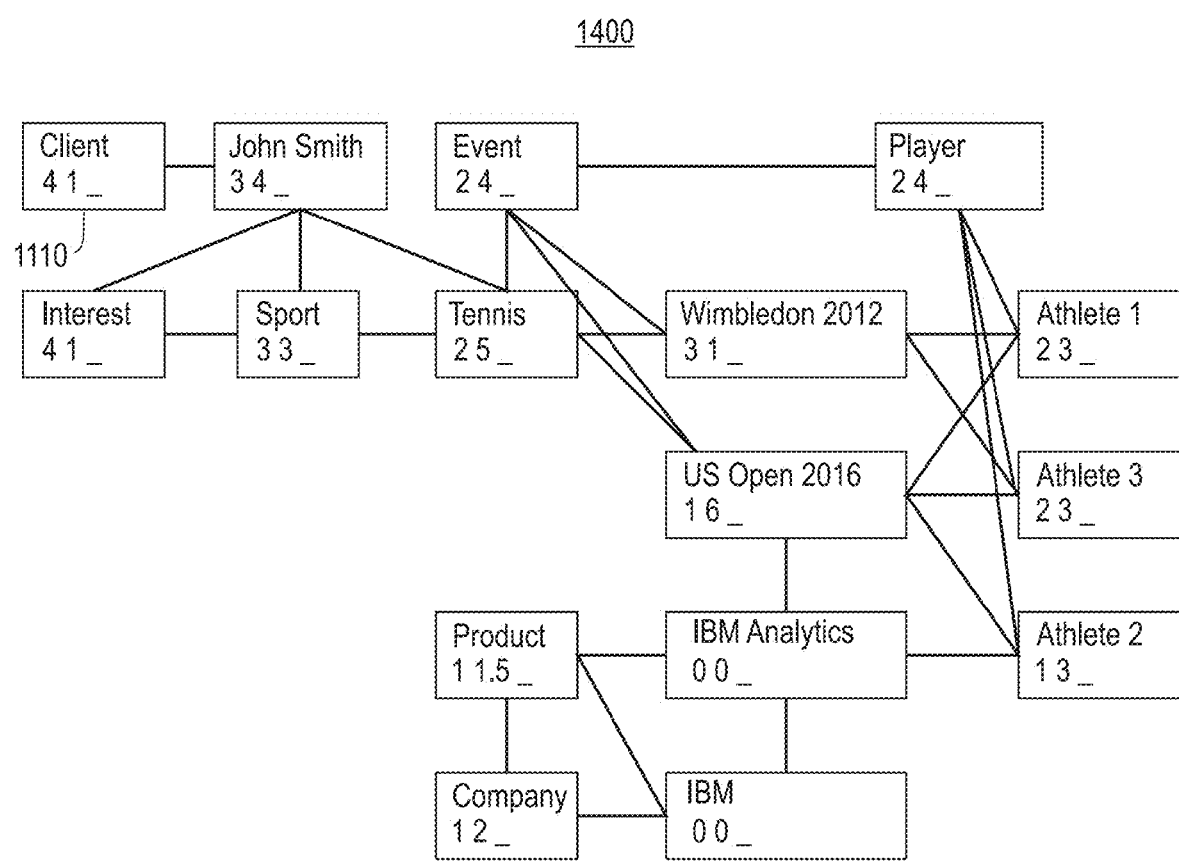
Figure 15:
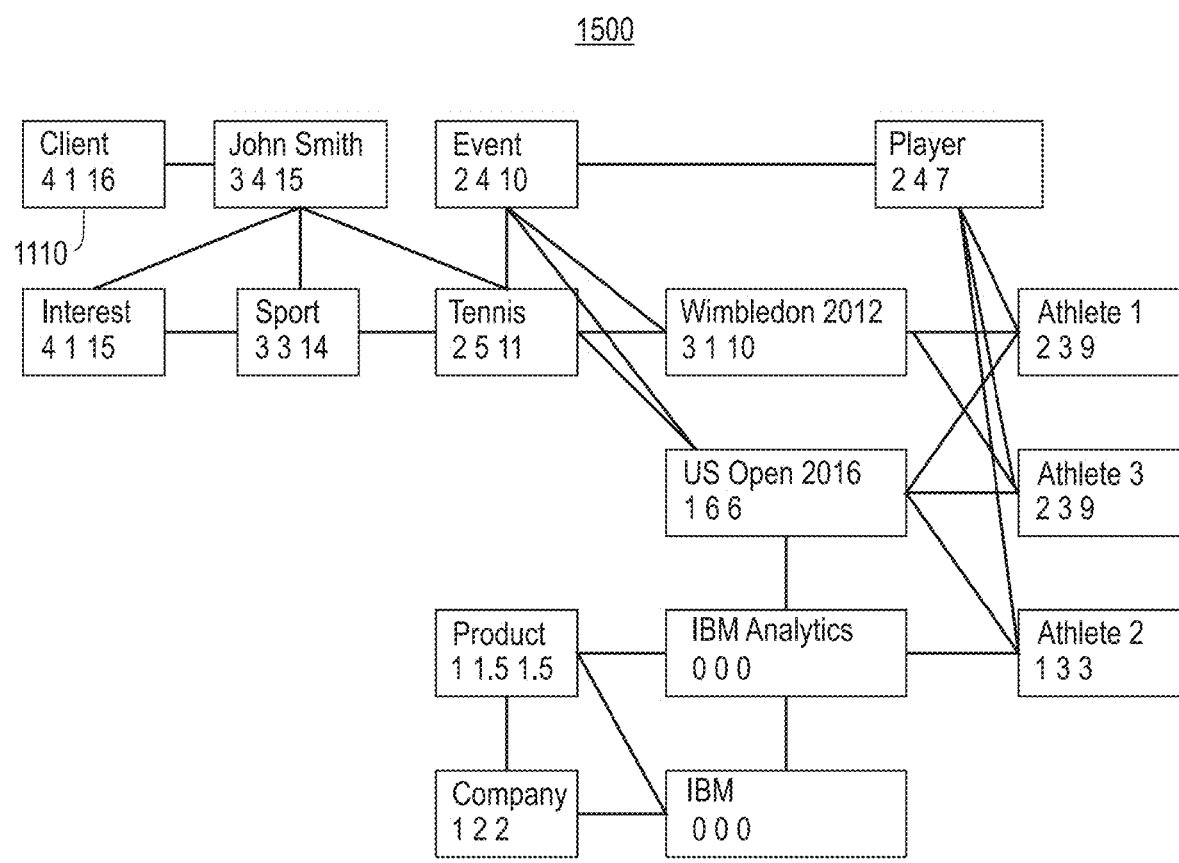

FIGS. 11-15 are examples views 1100, 1200, 1300, 1400 and 1500 of adding weights on nodes for bridging topics to a goal topic, according to an embodiment. In the example in FIGS. 11-15, the weights 1110 have three values for frontier, N-label and distance label (D-label). In the example shown in FIGS. 11-15, the weights are added to the nodes based on the process that uses the breadth-first searches shown in FIGS. 8 and 9. As shown, product Analytics and company, for example IBM, have zero values for frontier and N-label. In FIG. 12, the weights are filled in for frontier and N-label for Product, Company, U.S. Open 2016 and Murray. In FIG. 13, Event, Player, Federer, Djokovic and Tennis have weights filled in for frontier and N-label. In FIG. 14, Client, John Smith, Interest, Sport and Wimbledon 2012 have weights filled in for frontier and N-label. In FIG. 15 the topics, instance of topic and goals have weights filled in for the distance label.

Figure 16A:
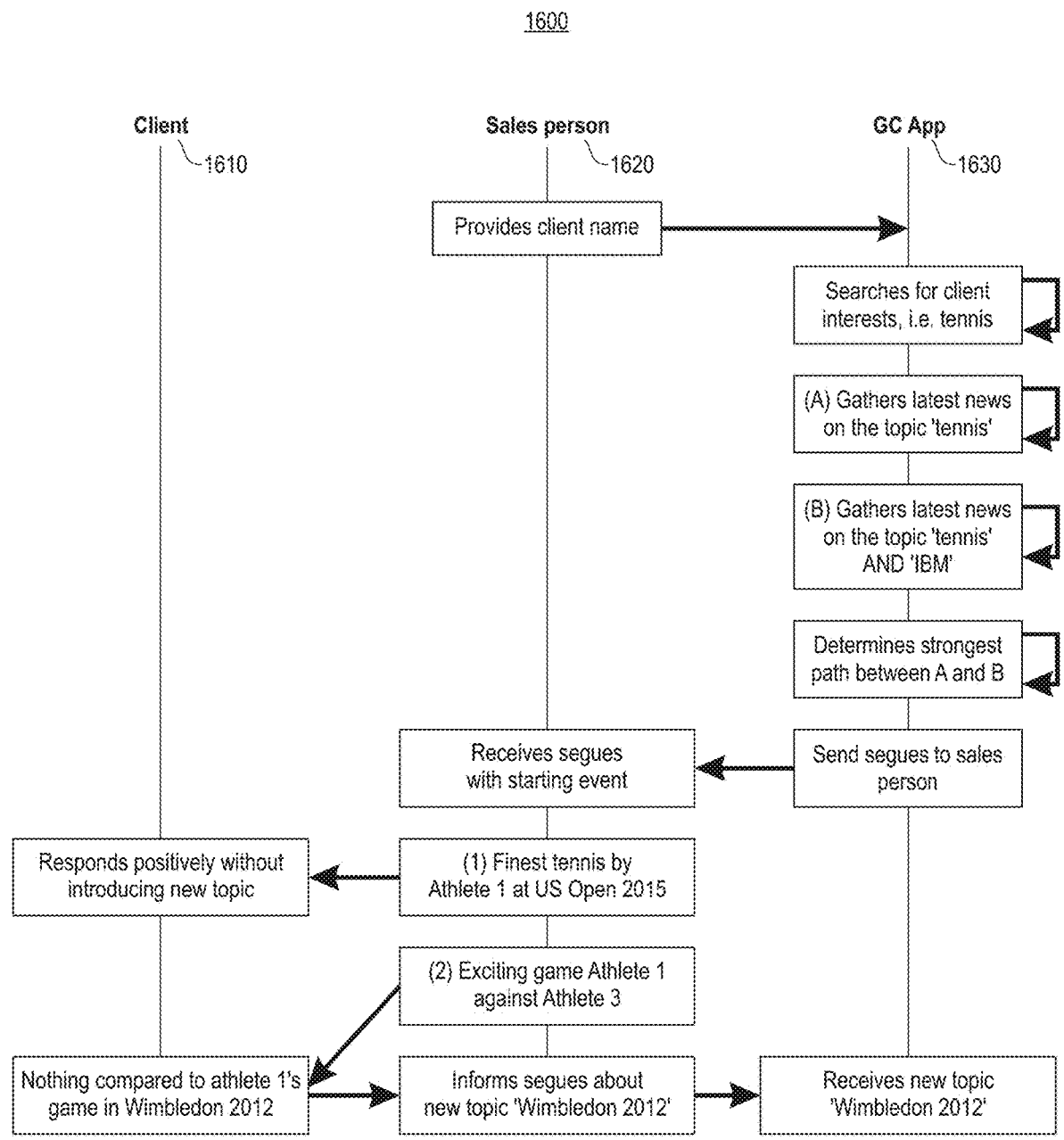
FIGS. 16A-B shows an example of interaction between a client and a salesperson using an embodiment for bridging topics to a goal topic using bridges of a topic graph, according to an embodiment.
Figure 16B:
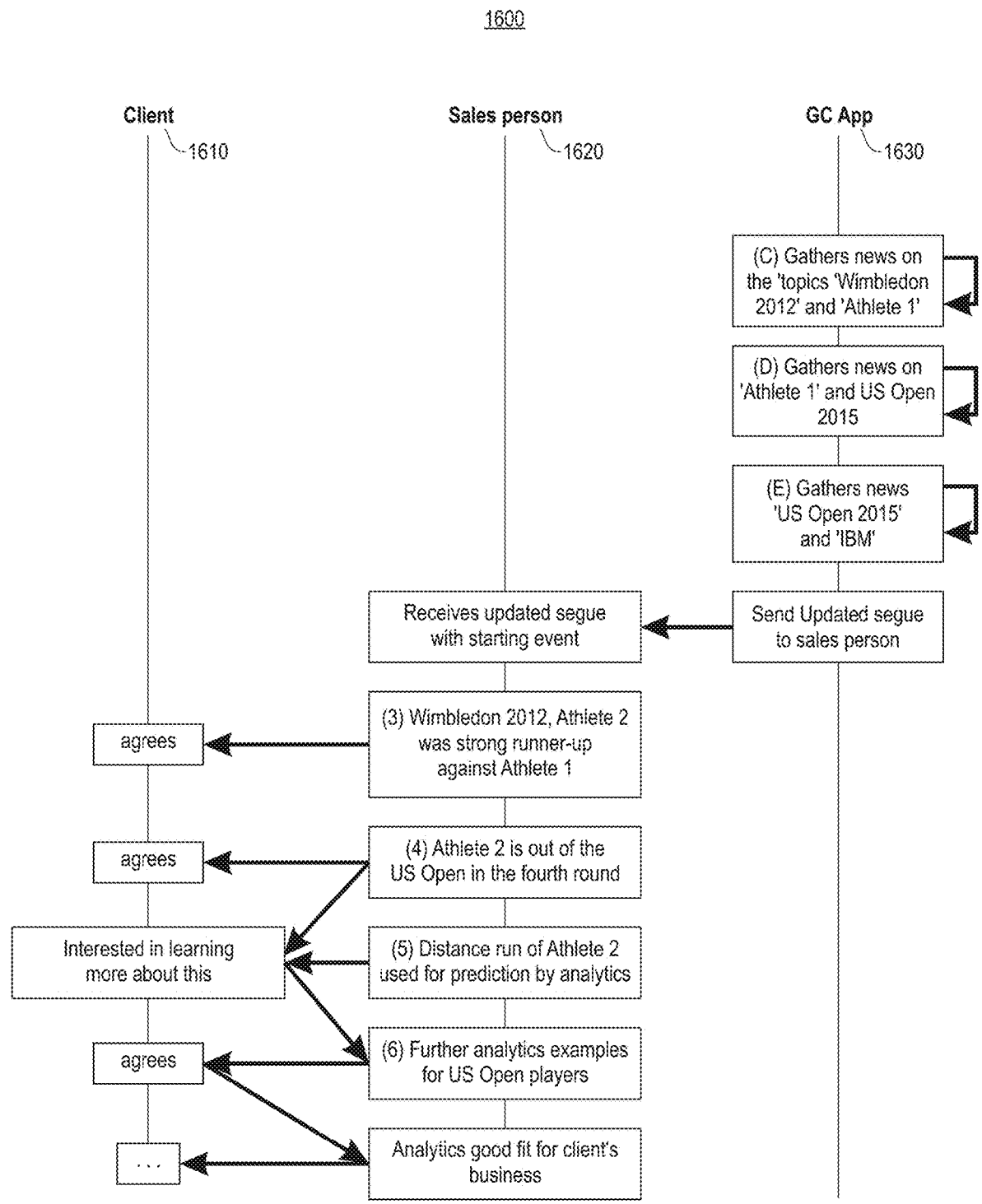

FIGS. 16A-B shows an example 1600 of interaction between a client 1610 and a salesperson 1620 using a guided conversation (GC) app 1630 for bridging topics to a goal topic using bridges of a topic graph, according to an embodiment. In example 1600, the GC app is used in the use-case for selling of a product. In this example 1600, the sales person 1620 provides the GC app with a client name. The GC app searches for the client's 1610 interests, (A) gathers news on the topic of "tennis," (B) gathers news for the topic "tennis" and "IBM," determines the strongest path between A and B and generates a communication of segues to the sales person 1620 with a starting event. The communication generated may be in the form of text messages to a smartphone or wearable device, speech (e.g., through an earbud the sales person 1620 is wearing), etc. The sales person 1620 may then proceed to communicate with the client 1610 using the segues received. The client 1610 communicates back to the sales person 1620 with a new topic that is provided to the GC app 1630.

In FIG. 16B, the GC app 1630 gathers (C) news on the new topics "Wimbledon 2012" and "Federer," gathers (D) news on the topics "Murray" and "U.S. Open 2015," gathers (E) news on topics "U.S. Open 2015" and "IBM" and determines an updated segue to send to the sales person 1620. The communication continues between the sales person 1620 and the client 1610 and where the client 1610 shows interest, further analytics examples for U.S. Open players is then communicated to the client 1610. This example illustrates the use of obtaining information or segues for conducting a dialog that is steered towards a goal topic. In other examples, the sales person 1620 may be a virtual sales person that may speak over the telephone, through a kiosk, may provide text in a chat session, etc.

Figure 17:
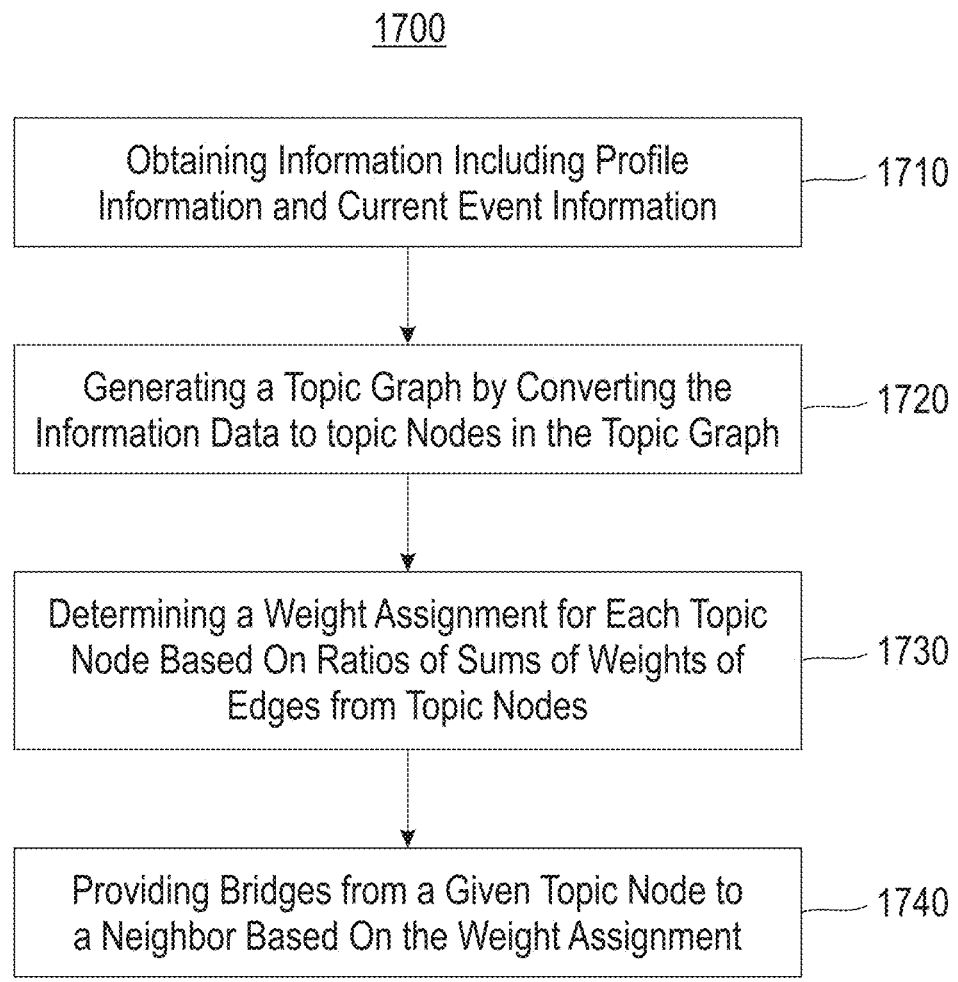
FIG. 17 illustrates a block diagram for a process for topic bridging determination using topic graphs, according to one embodiment.

FIG. 17 illustrates a block diagram for a process 1700 for topic bridging determination using topic graphs, according to one embodiment. In block 1710 process 1700 includes obtaining information including profile information and current event information. In block 1720, a processor (e.g., processor 510, FIG. 5) generates a topic graph by converting the information to topic nodes in the topic graph. In block 1730 the processor determines a weight assignment for each topic node based on ratios of sums of weights of edges from topic nodes. In block 1740 process 1700 provides bridges from a given topic node to a neighbor based on the weight assignment.

In one embodiment, the bridges comprise a selected set of conversational topics or topic instances that bridge from an initial topic instance to a set of one or more topic instances. Process 1700 may further include maintaining the topic graph based on individual profiles and the current event information, and maintaining weights on edges of the topic graph based on one or more snippets from news or text that relate topics connected by an edge.

In one embodiment, process 1700 may further include ordering the suggested paths based on the determined distance from one or more other topic nodes to the topic goal node via an earliest topic node on each suggested path, and providing the suggested paths based on the ordering. In one embodiment, in process 1700 determining of the distance comprises performing a breadth-first search of the topic graph to determine edge count distance from and reciprocal of a fraction of closer neighbor nodes based on edge count to a topic goal node. Process 1700 may further include converting a text snippet of the current event information into a set of one or more weighted edges between nodes in the topic graph that represents topics found in the text snippet.

In one embodiment, process 1700 may include that edge count distance is replaced by weighted edge count distance, the weights of edges being determined by a relative number of co-occurrences in the one or more snippets for current event or profile information of a pair of topic nodes connected by an edge. In one embodiment, the maintained weights are determined based on popularity of the one or more snippets, and the current event information comprises health event information for at least one profile.

In one embodiment, process 1700 may include that the provided suggested paths are converted: for display on an electronic device or for speech via a sound producing device, and that the converted suggested paths are provided to a virtual representative for use in a dialog for driving the dialog to a topic of the topic goal node.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

What is claimed is:

1. A method comprising:
    generating, by a processor, a topic graph by converting information to topic nodes and edges in the topic graph;
    providing bridges from a given topic node to a neighbor node based on a weight assignment;
    converting the bridges to an electronic form of communication;
    ordering, by the processor, suggested paths based on a determined distance from at least one other topic node to a topic goal node via an earliest topic node on each suggested path, wherein the determined distance is found by a first search of the topic graph; and
    performing a second search of the topic graph to determine labeling each node visited with a derived conversational distance to the topic goal node,
    wherein the suggested paths are converted for communication as segues for use in a dialog for steering the dialog to a topic of the topic goal node, and the segues are communicated to a virtual representative for use in the dialog for steering the dialog to the topic of the topic goal node.

2. The method of claim 1, further comprising:
    determining, by the processor, the weight assignment for each topic node based on ratios of sums of weights of edges from topic nodes;
wherein the first search of the topic graph determines edge count distance.

3. The method of claim 2, wherein the second search is a variant of a breadth-first search, and the information comprises profile information and current event information.

4. The method of claim 3, wherein the bridges comprise a selected set of conversational topics or topic instances that bridge from an initial topic instance to a set of one or more topic instances, and the electronic form of communication is one of a text message and virtual speech.

5. The method of claim 3, further comprising:
    maintaining the topic graph based on individual profiles and the current event information;
    maintaining weights on edges of the topic graph based on one or more snippets from news or text that relate topics connected by an edge; and
    providing the suggested paths based on the ordering.

6. The method of claim 5, further comprising:
    converting a text snippet of the current event information into a set of one or more weighted edges between nodes in the topic graph that represents topics found in the text snippet;
wherein the edge count distance is replaced by a weighted edge count distance, the weights of edges being determined by a relative number of co-occurrences in the one or more snippets for current event or profile information of a pair of topic nodes connected by an edge.

7. The method of claim 6, wherein:
    maintaining weights on edges of the topic graph results in maintained weights that are determined based on popularity of the one or more snippets; and
    current event information comprises health event information for at least one profile.

8. The method of claim 4, wherein:
    the provided suggested paths are converted: for display on an electronic device or for speech via a sound producing device.

9. A computer program product for topic bridging determination, the computer program product comprising a computer readable storage medium having program instructions embodied therewith, the program instructions executable by a processor to cause the processor to:
    generate, by the processor, a topic graph by converting information data to topic nodes in the topic graph;
    provide, by the processor, bridges from a given topic node to a neighbor node based on a weight assignment;
    convert, by the processor, the bridges to an electronic form of communication;
    order, by the processor, suggested paths based on a determined distance from at least one other topic node to a topic goal node via an earliest topic node on each suggested path, wherein the determined distance is found by the first search of the topic graph; and
    perform, by the processor, a second search of the topic graph to determine labeling each node visited with a derived conversational distance to the topic goal node, wherein the suggested paths are converted for communication as segues for use in a dialog for steering the dialog to a topic of the topic goal node, and the segues are communicated to a virtual representative for use in the dialog for steering the dialog to the topic of the topic goal node.

10. The computer program product of claim 9, further comprising program instructions executable by the processor to cause the processor to:
    determine, by the processor, the weight assignment for each topic node based on ratios of sums of weights of edges from topic nodes;
wherein the first search of the topic graph determines edge count distance.

11. The computer program product of claim 10, wherein the second search is a variant of a breadth-first search, and the information comprises profile information and current event information.

12. The computer program product of claim 11, wherein the bridges comprise a selected set of conversational topics or topic instances that bridge from an initial topic instance to a set of one or more topic instances, and the electronic form of communication is one of a text message and virtual speech.

13. The computer program product of claim 11, further comprising program instructions executable by the processor to cause the processor to:
    maintain, by the processor, the topic graph based on individual profiles and the current event information;

maintain, by the processor, weights on edges of the topic graph based on one or more snippets from news or text that relate topics connected by an edge; and provide, by the processor, the suggested paths based on the ordering.

14. The computer program product of claim 12, further comprising program instructions executable by the processor to cause the processor to:

convert, by the processor, a text snippet of the current event information into a set of one or more weighted edges between nodes in the topic graph that represents topics found in the text snippet;

wherein:

the edge count distance is replaced by weighted edge count distance, the weights of edges being determined by a relative number of co-occurrences in the one or more snippets for current event or profile information of a pair of topic nodes connected by an edge;

the maintained weights are determined based on popularity of the one or more snippets; and the current event information comprises health event information for at least one profile.

15. The computer program product of claim 12, wherein:
the provided suggested paths are converted: for display on an electronic device or for speech via a sound producing device.

16. An apparatus comprising:
a memory storing instructions; and
a processor executing the instructions to:

generate a topic graph by converting information to topic nodes and edges in the topic graph;

provide bridges from a given topic node to a neighbor node based on a weight assignment;

convert the bridges to an electronic form of communication;

order suggested paths based on a determined distance from at least one other topic node to a topic goal node via an earliest topic node on each suggested path, wherein the determined distance is found by a first search of the topic graph; and perform a second search of the topic graph to determine labeling each node visited with a derived conversational distance to the topic goal node, wherein the suggested paths are converted for communication as segues for use in a dialog for steering the dialog to a topic of the topic goal node, and the segues are communicated to a virtual representative for use in the dialog for steering the dialog to the topic of the topic goal node.

17. The apparatus of claim 16, wherein:
the processor further executes instructions to:

determine the weight assignment for each topic node based on ratios of sums of weights of edges from topic nodes; and the second search is a variant of a breadth-first search, and the information comprises profile information and current event information.

18. The apparatus of claim 17, wherein the processor further executes instructions to:

maintain the topic graph based on individual profiles and the current event information;

maintain weights on edges of the topic graph based on one or more snippets from news or text that relate topics connected by an edge; and provide the suggested paths based on the ordering;

wherein the first search of the topic graph determines edge count distance, and current event information comprises health event information for at least one profile.

19. The apparatus of claim 17, wherein the processor further executes instructions to:

convert a text snippet of the current event information into a set of one or more weighted edges between nodes in the topic graph that represents topics found in the text snippet;

wherein the edge count distance is replaced by a weighted edge count distance, the weights of edges being determined by a relative number of co-occurrences in the one or more snippets for current event or profile information of a pair of topic nodes connected by an edge.

20. The apparatus of claim 18, wherein:
the provided suggested paths are converted: for display on an electronic device or for speech via a sound producing device.

\* \* \* \* \*